United States Patent [19]
Kaihara

[11] Patent Number: 5,689,744
[45] Date of Patent: Nov. 18, 1997

[54] CAMERA

[75] Inventor: Shoji Kaihara, Kanagawa-ken, Japan

[73] Assignee: Canon Kabushiki Kaisha, Tokyo, Japan

[21] Appl. No.: 791,540

[22] Filed: Jan. 31, 1997

Related U.S. Application Data

[63] Continuation of Ser. No. 290,459, Aug. 15, 1994, abandoned.

[30] Foreign Application Priority Data

Sep. 1, 1993 [JP] Japan ................................. 5-217558

[51] Int. Cl.$^6$ ................................. G03B 17/42
[52] U.S. Cl. ................................. 396/411
[58] Field of Search ................................. 395/387, 411, 395/412, 413, 414, 415, 416, 417, 418, 535

[56] References Cited

U.S. PATENT DOCUMENTS

| | | | |
|---|---|---|---|
| 4,340,289 | 7/1982 | Maida | 354/173 |
| 4,576,457 | 3/1986 | Fukuda et al. | 354/173.11 |
| 4,967,213 | 10/1990 | Han | 354/173.1 |
| 4,967,216 | 10/1990 | Nishio et al. | 354/173.1 |
| 5,105,211 | 4/1992 | Kameyama | 354/173.1 |
| 5,329,328 | 7/1994 | Haraguchi et al. | 354/152 |
| 5,337,108 | 8/1994 | Kaihara et al. | 354/218 |
| 5,422,695 | 6/1995 | Katagiri | 354/173.1 |

*Primary Examiner*—Safet Metjahic
*Assistant Examiner*—Nicholas J. Tuccillo
*Attorney, Agent, or Firm*—Robin, Blecker, Daley and Driscoll

[57] ABSTRACT

In a camera having a motor disposed within a spool which is a part of a film winding mechanism, an internal toothed portion of a planetary gear transmission mechanism for transmitting the power of the motor in a reduced state is formed at a base plate which has a spool support part arranged to support the spool.

19 Claims, 3 Drawing Sheets

CAMERA

This is a continuation application under 37 CFR 1.62 of prior application Ser. No. 08/290,459, filed Aug. 15, 1994, now abandoned.

BACKGROUND OF THE INVENTION

1. Field of the Invention

This invention relates to a camera of the kind having a motor within a spool, and more particularly to a power transmission mechanism of the camera.

2. Description of the Related Art

The conventional power transmission mechanism of the camera of the kind having a motor within a spool has been composed of, as shown by way of example in FIG. 3, a camera body 1, a spool 12 arranged to wind up a film, a motor 6 which is a power source, a holding member 4 which holds the motor 6 on the camera body 1, a first output gear 7 which is secured to the output shaft of the motor 6, a gear group 17 which is arranged to transmit the rotation of the first output gear 7 by reducing the speed of it, and a bottom cover 16. The spool 12 is rotatably supported by the holding member 4. The first output gear 7 and the gear group 17 are arranged in a state of protruding toward the bottom cover 16.

However, in the case of the example of the conventional mechanism described above, the first output gear 7 and the gear group 17 protrude from the holding member 4 toward the bottom cover 16, and the mechanism also requires a high reduction ratio. Therefore, the size of the gear group 17 becomes large to necessitate a large space between the holding member 4 and the bottom cover 16. The large space results in an increase in the size of the camera in the direction of its height.

SUMMARY OF THE INVENTION

One aspect of this invention resides in the provision of a small-sized camera which is arranged to solve the above-stated problem of the prior art. The camera arranged according to this invention includes an actuator arranged as a drive source for a camera operating mechanism, a transmission mechanism arranged to transmit a driving force of the actuator to the camera operating mechanism, and a base plate arranged to support at least a part of the camera operating mechanism or the transmission mechanism, wherein the base plate is provided with a toothed portion arranged to mesh with a gear which is a part of the transmission mechanism.

The above and other aspects and features of this invention will become apparent from the following detailed description of an embodiment thereof taken in conjunction with the accompanying drawings.

DETAILED DESCRIPTION OF THE PREFERRED EMBODIMENT

Figure 1:
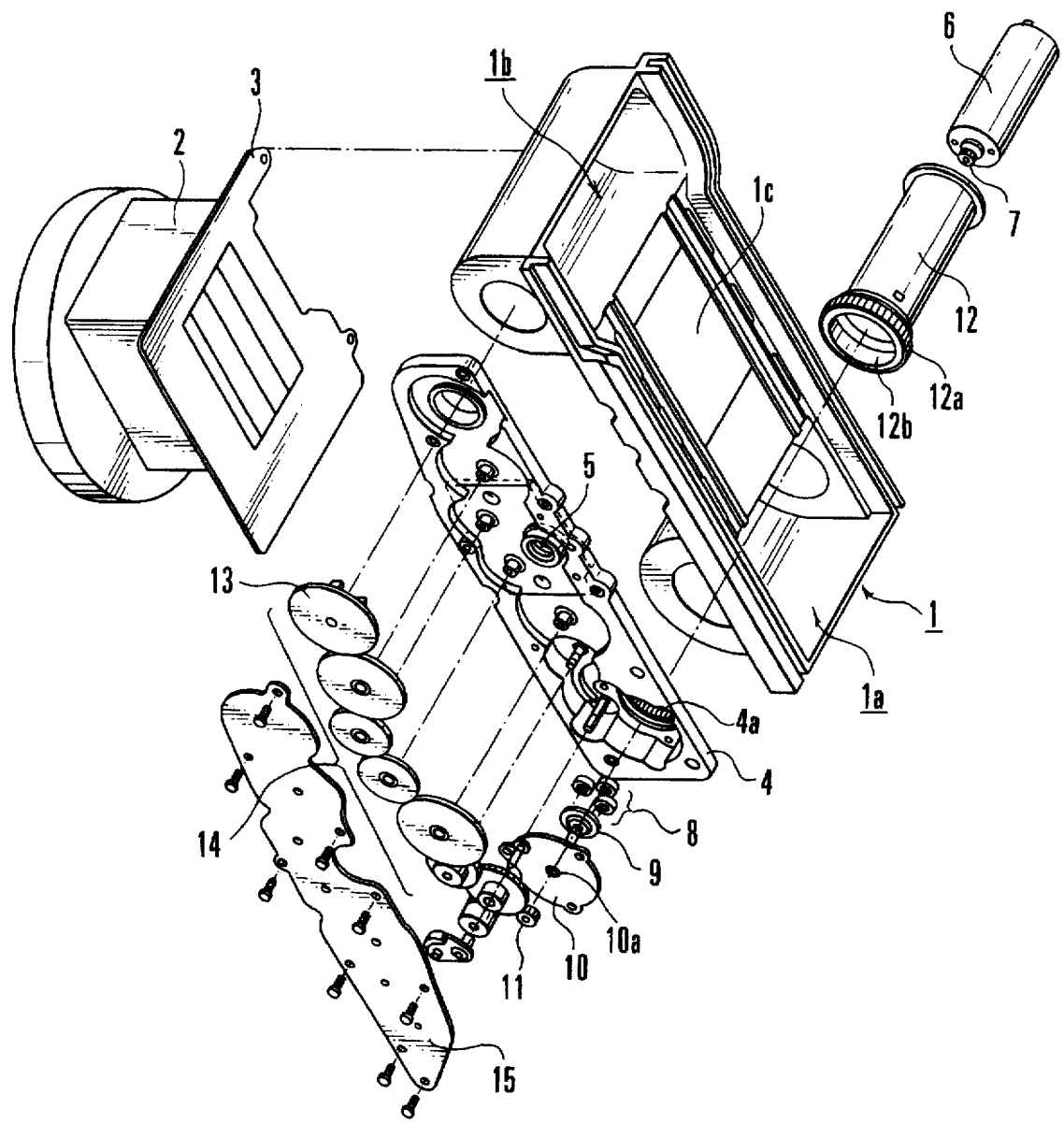
FIG. 1 is an exploded oblique view showing the essential parts of a camera arranged according to this invention as an embodiment thereof.
Figure 2:
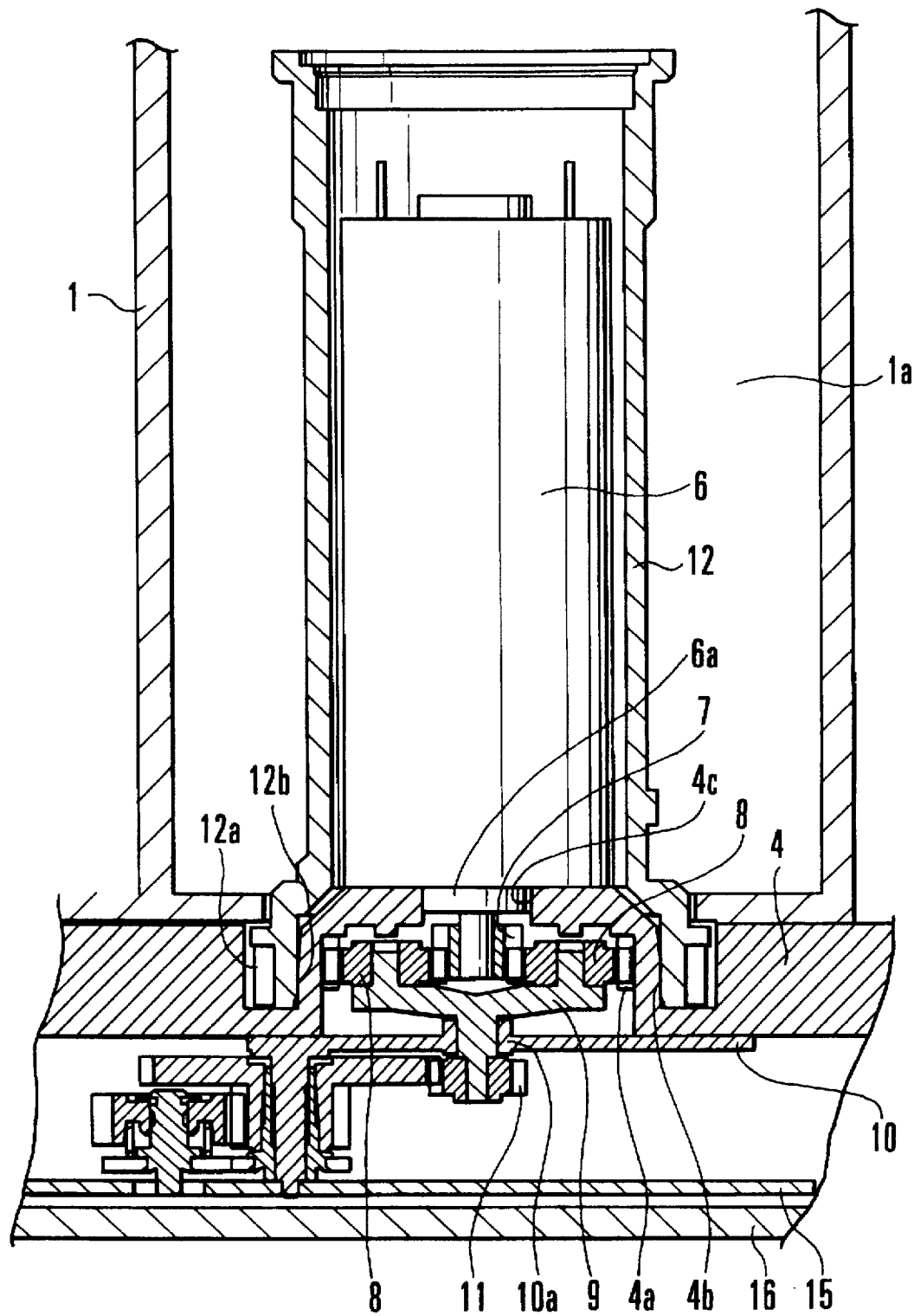
FIG. 2 is a sectional view showing the essential parts of the same embodiment.
Figure 3:
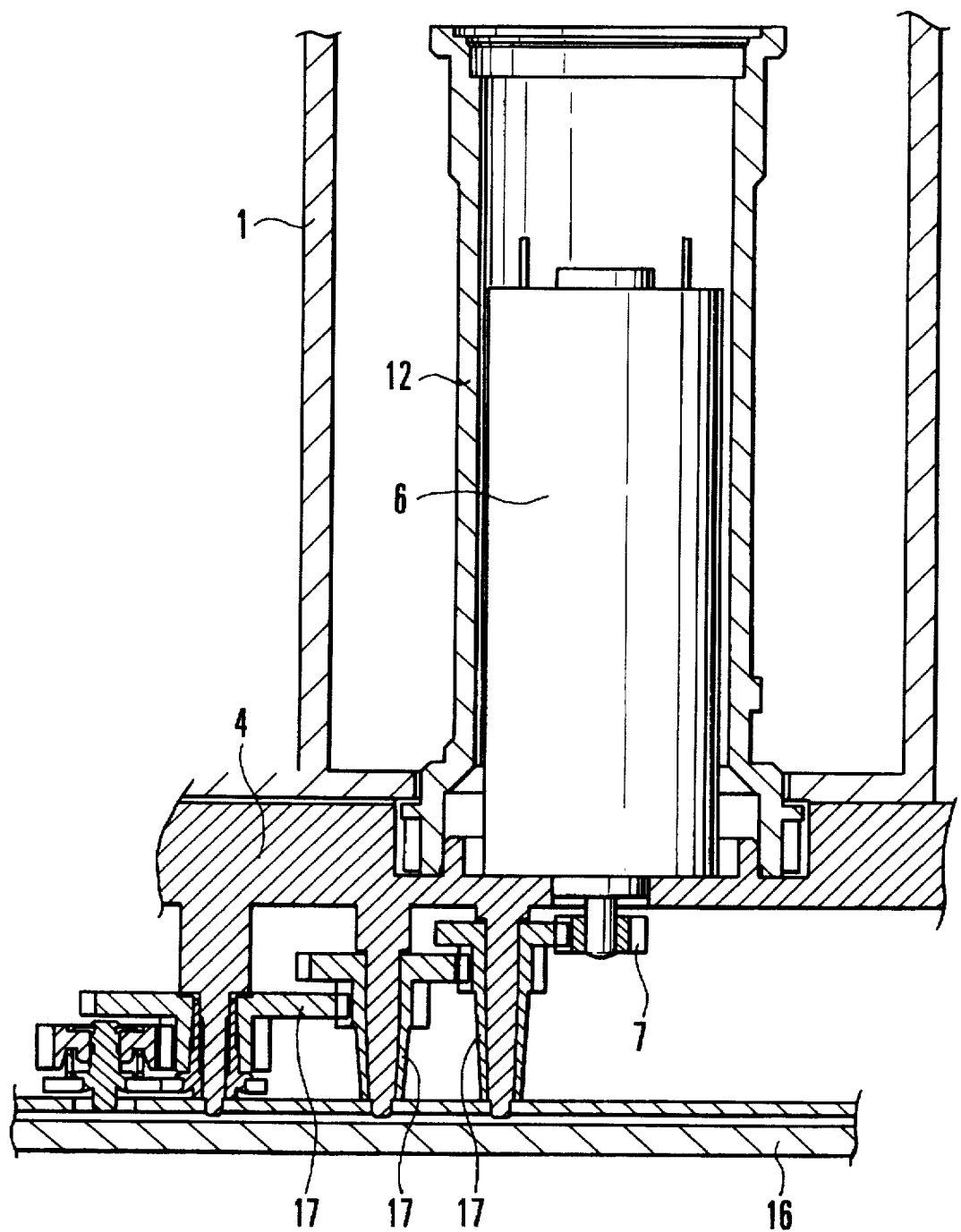
FIG. 3 is a sectional view showing by way of example the essential parts of the conventional camera.

The features of this invention are best shown in FIGS. 1 and 2. The illustrations include a camera body 1, a spool chamber 1a, a film cartridge chamber 1b and an aperture 1c for exposing the film to light. A mirror box 2 contains a mirror (not shown) and a mechanism for driving the mirror. A shutter unit 3 is secured to the rear side of the mirror box 2. A base plate 4 as a base member is secured to the camera body 1 and the mirror 2 as a holding member and covers almost the whole bottom of the camera body 1. The base plate 4 is provided with an internal toothed portion 4a which is formed in the inner circumferential wall part of the spool chamber 1a, a spool support part 4b, a hole part 4c which fixedly supports a motor 6, and a tripod attaching screw part 5. The motor 6 is arranged as a drive source. A bearing part 6a which is provided for the output shaft of the motor 6 is radially positioned by fitting it into the hole part 4c and is fixedly supported by the base plate 4. A pinion gear 7 is secured to the output shaft of the motor 6 as a first output gear. Planetary gears 8 are arranged to revolve between the pinion gear 7 and the internal toothed portion 4a. A carrier 9 is arranged to be rotated by the revolution of the planetary gears 8. A cover 10 is secured to the base plate 4 and is provided with a bearing part 10a for rotatably supporting the shaft of the carrier 9. An output gear 11 which serves as a second output gear is secured to the shaft of the carrier 9 and is arranged to be rotated by the revolution of the planetary gears 8. A spool 12 is arranged to wind up a film thereon. The spool 12 has its upper end rotatably supported by the upper side of the camera body 1 and has a gear part 12a formed at an outer circumferential part of the lower end thereof. The spool 12 further has a sliding part 12b arranged on the inner diameter side thereof to be rotatably supported by the spool support part 4b of the base plate 4. A fork gear 13 is provided for rewinding the film. A gear train 14 including a planetary gear clutch is arranged to transmit the rotation in one direction of the motor 6 to the gear part 12a of the spool 12 and to transmit the rotation of the motor 6 in the other direction to the fork gear 13 in rewinding the film. A gear cover 15 is arranged to retain the group of gears in place. A bottom cover 16 is attached to the outside of the gear cover 15 to give an external appearance. A planetary gear mechanism which is composed of the pinion gear 7, the planetary gears 8 and the internal toothed portion 4a of the base plate 4 is arranged to serve as a part of a reduction mechanism which reduces the speed of the rotation of the output shaft of the motor 6 and transmits the reduced rotation to the second output gear 11. This arrangement enables the second output gear 11 to be set in the same position as the first output gear 7 of the conventional camera arrangement. Therefore, the number of gears which have to be arranged in a state of protruding from the base plate 4 toward the bottom cover 16 is lessened to permit the reduction of a space between the base plate 4 and the bottom cover 16, so that the height of the camera can be lessened.

Since the internal toothed portion 4a is formed on the base plate 4 as a part of the reduction mechanism, the internal toothed portion 4a can be arranged to have a larger diameter than a case where an internal gear is included in a planetary gear reduction mechanism which is formed separately from a base plate. The arrangement of the embodiment thus permits the camera to have a higher reduction ratio with a smaller number of parts than the conventional camera arrangement.

Further, since the spool support part 4b which is arranged to position the motor 6 in the radial direction of the spool 12 and the internal toothed portion of the planetary reduction mechanism are made of the same material, the positions of the group of gears of the planetary reduction mechanism can be more precisely set than a case where the spool support part 4b is made of a material different from the material of an internal gear of a planetary reduction mechanism. In other words, the precision of the position of the output shaft of the motor 6 and that of the internal toothed portion 4a can be enhanced. This in turn enhances the precision of the positional relation between the pinion gear 7 and the internal toothed portion 4a, so that the planetary gears 8 can be allowed to efficiently rotate and revolve.

What is claimed is:

1. A camera comprising:

a) an actuator arranged as a drive source for a camera operating mechanism;

b) a transmission mechanism arranged to transmit a driving force of said actuator to said camera operating mechanism; and c) a base member arranged to support at least a part of said transmission mechanism, said base member having a stationary toothed portion formed directly on said base member and arranged to mesh with a gear which is connected to said part of said transmission mechanism.

2. A camera according to claim 1, wherein said toothed portion is composed of internal teeth.

3. A camera according to claim 1, wherein said base plate has a spool support part arranged to support a spool which is a part of a film winding mechanism included in said camera operating mechanism.

4. A camera according to claim 3, wherein said spool is of a hollow structure, and wherein said actuator is disposed inside said spool.

5. A camera according to claim 3, wherein said toothed portion is disposed on an inner side of said spool support part.

6. A camera according to claim 1, wherein said gear is a planetary gear which meshes with said toothed portion and said planetary gear functions as a part of said transmission mechanism.

7. A camera according to claim 6, wherein said transmission mechanism is a planetary reduction mechanism.

8. A camera according to claim 6, wherein said actuator is a motor, and wherein an output gear of said motor is arranged to mesh with said planetary gear.

9. A camera according to claim 6, wherein the position of a first transmission gear which is rotated by the revolution of said planetary gear is substantially determined by the position of said toothed portion.

10. A camera according to claim 9, wherein a second transmission gear which is arranged to mesh with said first transmission gear and included in said transmission mechanism is rotatably supported by said base member.

11. A camera according to claim 10, wherein said second transmission gear is rotatably supported by a shaft which is disposed directly on said base member.

12. An optical apparatus comprising:

a) an actuator arranged as a drive source for an operating mechanism of said optical apparatus;

b) a transmission mechanism arranged to transmit a driving force of said actuator to said operating mechanism of said optical apparatus; and c) a base member arranged to support at least a part of said transmission mechanism, said base member having a stationary toothed portion formed directly on said base member and arranged to mesh with a gear which is connected to said part of said transmission mechanism.

13. An optical apparatus according to claim 12, wherein said toothed portion is composed of internal teeth.

14. An optical apparatus according to claim 12, wherein said gear is a planetary gear which meshes with said toothed portion and said planetary gear functions as a part of said transmission mechanism.

15. An optical apparatus according to claim 14, wherein said transmission mechanism is a planetary reduction mechanism.

16. An optical apparatus according to claim 14, wherein said actuator is a motor, and wherein an output gear of said motor is arranged to mesh with said planetary gear.

17. An optical apparatus according to claim 14, wherein the position of a first transmission gear which is arranged to be rotated by the revolution of said planetary gear is substantially determined by the position of said toothed portion.

18. An optical apparatus according to claim 17, wherein a second transmission gear which is arranged to mesh with said first transmission gear is rotatably supported by said base member.

19. An optical apparatus according to claim 18, wherein said second transmission gear is rotatably supported by a shaft which is disposed directly on said base plate.

* * * * *